United States Patent
Takagi

[11] Patent Number: 5,719,462
[45] Date of Patent: Feb. 17, 1998

[54] ULTRASONIC MOTOR HAVING IMPROVED STATOR

[75] Inventor: Tadao Takagi, Yokohama, Japan

[73] Assignee: Nikon Corporation, Tokyo, Japan

[21] Appl. No.: 668,389

[22] Filed: Jun. 25, 1996

Related U.S. Application Data

[63] Continuation of Ser. No. 404,130, Mar. 14, 1995, abandoned, which is a continuation of Ser. No. 188,789, Jan. 31, 1994, abandoned.

[30] Foreign Application Priority Data

Feb. 5, 1993 [JP] Japan .................... 5-019099

[51] Int. Cl.⁶ .................... H01L 41/08
[52] U.S. Cl. .................... 310/323; 310/358; 310/359; 310/367
[58] Field of Search .................... 310/328, 323, 310/366, 367, 368

[56] References Cited

U.S. PATENT DOCUMENTS

| | | | |
|---|---|---|---|
| 3,964,014 | 6/1976 | Tehon | 310/367 X |
| 4,580,073 | 4/1986 | Okumura et al. | 310/323 |
| 4,678,956 | 7/1987 | Izukawa et al. | 310/323 |
| 4,742,260 | 5/1988 | Shimizu et al. | 310/323 |
| 4,788,468 | 11/1988 | Izukawa et al. | 310/323 |
| 4,857,793 | 8/1989 | Okuno | 310/323 |
| 4,871,937 | 10/1989 | Kawai | 310/323 |
| 5,079,470 | 1/1992 | Kasuga et al. | 310/323 |
| 5,200,665 | 4/1993 | Uijima | 310/323 |
| 5,293,094 | 3/1994 | Flynn et al. | 310/323 |
| 5,418,418 | 5/1995 | Hirano et al. | 310/328 |
| 5,451,827 | 9/1995 | Takegi | 310/323 |
| 5,453,653 | 9/1995 | Zumeris | 310/323 |

FOREIGN PATENT DOCUMENTS

| | | | |
|---|---|---|---|
| 0 569 673 A1 | 11/1993 | European Pat. Off. | |
| 0180582 | 8/1986 | Japan | 310/323 |
| 0077481 | 3/1989 | Japan | 310/323 |
| 0077485 | 3/1989 | Japan | 310/323 |
| 0055585 | 2/1990 | Japan | 310/323 |
| 0202380 | 8/1990 | Japan | 310/323 |
| 0228272 | 9/1990 | Japan | 310/323 |
| 0260476 | 10/1990 | Japan | 310/328 |

*Primary Examiner*—Mark O. Budd

[57] ABSTRACT

An ultrasonic motor with a stator uniformly made of a material that can convert electrical energy to mechanical energy. The stator includes a first part having two corresponding electrodes for applying a signal to the first part, and a second part, uniformly configured to the first part, having an area adjacent to the first part where the material does not exist. The second part does not exist between the electrodes. A moving element is in contact with the second part and driven by progressive oscillation waves generated in the second part due to the signal applied to the electrodes.

48 Claims, 5 Drawing Sheets

ULTRASONIC MOTOR HAVING IMPROVED STATOR

This application is a continuation of application Ser. No. 08/404,130, filed on Mar. 14, 1995, now abandoned, which is a continuation of application Ser. No. 08/188,789, filed on Jan. 31, 1994, now abandoned.

BACKGROUND OF THE INVENTION

1. Field of the Invention

The present invention relates to ultrasonic motors and, more particularly, to ultrasonic motors which have improved stator design and utilize ultrasound oscillation.

2. Description of the Related Art

Japanese Patent Publication Number 1-17353 discloses an ultrasonic motor in which the motor stator comprises a resilient body made of metals and other materials wherein the resilient body is attached to an electro-mechanical converting element composed of a piezoelectric body.

However, as recognized by the present invention, a conventional device as disclosed in Japanese Patent Publication Number 1-17353 experiences fluctuations in performance due to temperature changes or the deterioration of weather-proofing capability in the attached parts. The present invention recognizes that these problems can be attributed to the attaching of different types of materials comprising the stator.

Also, the use of numerous materials to comprise the stator can increase the overall cost of the motor.

SUMMARY OF THE INVENTION

Accordingly, it is an object of the present invention to prevent fluctuations in performance of an ultrasonic motor due to changes in temperature and deterioration of weather-proofing capability of the attached parts comprising the stator.

It is an additional object of the present invention to reduce costs associated with stator design.

It is a further object to provide a stator which is uniformly made of a material that can convert electrical energy to mechanical energy, without having an adhesive layer between parts of the stator.

Additional objects and advantages of the invention will be set forth in part in the description which follows, and, in part, will be obvious from the description, or may be learned by practice of the invention.

The foregoing objects of the present invention are achieved by providing a motor comprising a stator made of a material that can convert electrical energy to mechanical energy. The stator has a first part with two corresponding electrodes for applying a signal to the first part, and a second part, uniformly configured to the first part, having an area adjacent to the first part where the material does not exist. This area acts to partially separate the second part from the first part. The second part does not exist between the electrodes. The motor further includes a moving element in contact with the second part and driven by progressive oscillation waves generated in the second part due to the signal applied to the electrodes.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
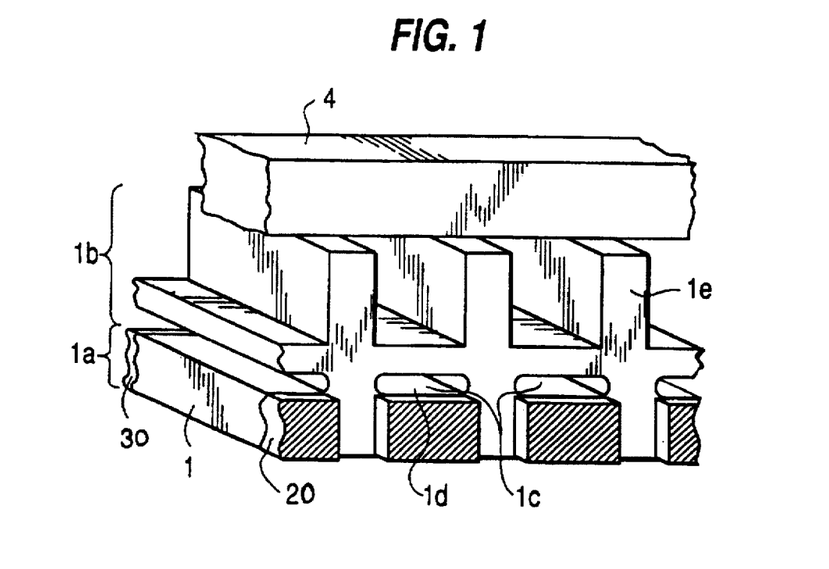
FIG. 1 is a perspective view of the first embodiment for the ultrasonic motor of the present invention.
Figure 2A:
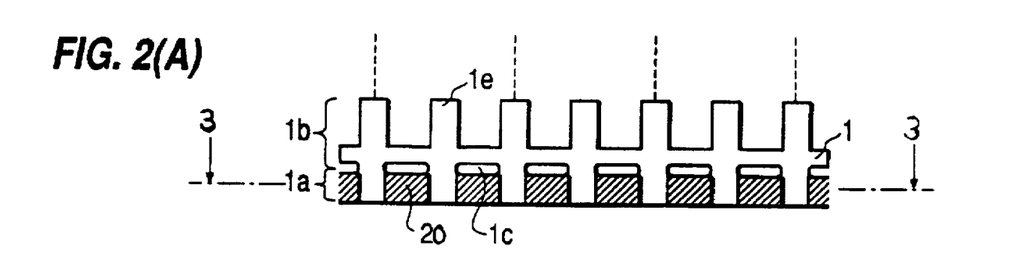
FIG. 2(A) is a front view of the stator of a first embodiment of the present invention.
Figure 2B:
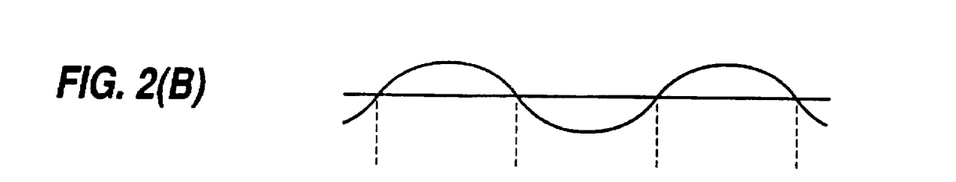
FIG. 2(B) is a diagram of a progressive oscillation wave.
Figure 3:
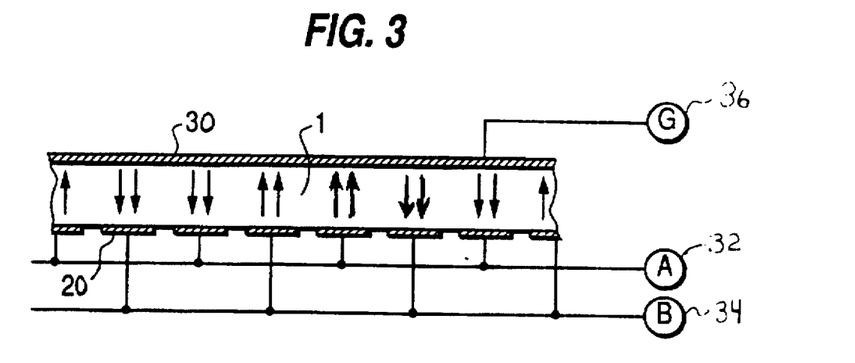
FIG. 3 is a cross-sectional view along line 3—3 of FIG. 2.

FIGS. 1 through 3 illustrate a first embodiment of the present invention. Referring now to FIG. 1, the entirety of stator 1 is uniformly made of an identical material. The material is such that it can convert electrical energy to mechanical energy by applying a "specified process." This specified process refers to a polarization process applied to stator 1. In the preferred embodiment, PZT (plumb zirconate titanate) is used as the material forming stator 1.

A first part 1a of stator 1 has electrodes 20 and 30 on both sides which are perpendicular to a surface that is in contact with moving element 4. An area excluded from the first part 1a of stator 1 is referred to as second part 1b. Second part 1b has opening 1c in which PZT does not exist. The shape of opening 1c should be either rectangular or oval. Frequency voltage is applied to the area between electrodes 20 and electrode 30, thereby stretching first part 1a in the direction in which electrodes 20 and 30 are positioned. When first part 1a stretches, progressive oscillation waves are generated in comb-tooth part 1e from part 1d above opening 1c. Therefore, comb-tooth part 1e acts as a fulcrum.

In FIG. 1, the vertical cross-sectional shape of stator 1 (cross-sectional shape that includes comb-tooth part 1e) is roughly square. However, it may be rectangular, trapezoid, or circular.

Moving element 4 is in contact with second part 1b of stator 1 and is driven by progressive oscillation waves that are generated. The process of driving a moving element by progressive oscillation waves is described in Japanese Laid-Open Patent Publication Number 1-17353 and, therefore, a detailed explanation of this process is omitted here.

FIG. 2(A) is a front view of stator 1 and FIG. 2(B) is a diagram that explains the correlation between the arrangement of electrodes and the wavelength of progressive oscillation waves. As illustrated in FIGS. 2(A) and 2(B), the arrangement of four electrodes 20 correspond to one wavelength.

FIG. 3 is a cross-sectional view taken from line 3—3 in FIG. 2(A) and illustrates the correlation between the polarized arrangement of stator 1 and the method of applying frequency voltage. For applying frequency voltage, phase A voltage from terminal A 32 and phase B voltage from terminal B 34 are alternately applied through space via electrodes 20. Electrode 30 is connected to ground through terminal G 36. Phase A and phase B voltages are, for timing purposes, $\pi/2$ phase apart to each other. For a polarized arrangement, each pair of electrodes 20 is alternately polarized in opposite directions, wherein every two electrodes 20 are polarized in the same direction (see FIG. 3). Electrode 30 is a shared electrode. A detailed explanation of the principle regrading how progressive oscillation waves are generated is described in Japanese Laid-Open Patent Publication Number 60-245482 and will therefore be omitted here.

Figure 4:
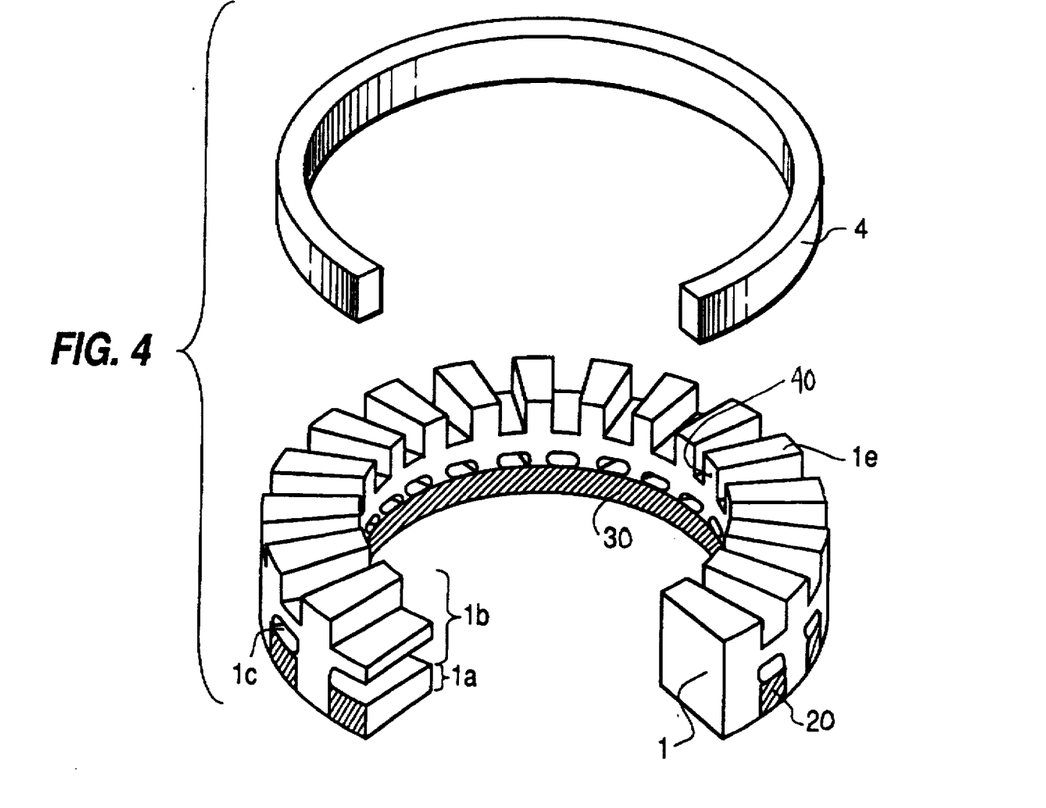
FIG. 4 is a perspective, exploded view of a circular-type stator and corresponding moving element.

FIG. 4 is a perspective, exploded view where stator 1 of an embodiment of the present invention is configured in a circular shape. Reference numerals identical to reference numbers in previous figures represent elements having identical functions. For convenience of manufacturing stator 1, the width of square side 40 of comb-tooth part 1e may be expanded further as stator 1 is stretched in the direction of the radius. In addition, the width of a depression between adjacent comb-tooth parts 1e may be expanded further as stator 1 is stretched in the direction of the radius. Furthermore, the opening width of opening 1c may be expanded further as stator 1 is stretched in the direction of the radius. In FIG. 4, the thickness of electrodes 20 and 30 are not as exaggerated as illustrated in FIG. 1. In a preferred embodiment, opening 1c is positioned so as to have an identical pitch (that is, slope or angle) as the area of first part 1a existing between electrodes 20 and 30. As can be seen in FIG. 4, the slope of opening 1c is parallel to the slope of first part 1a.

Figure 5:
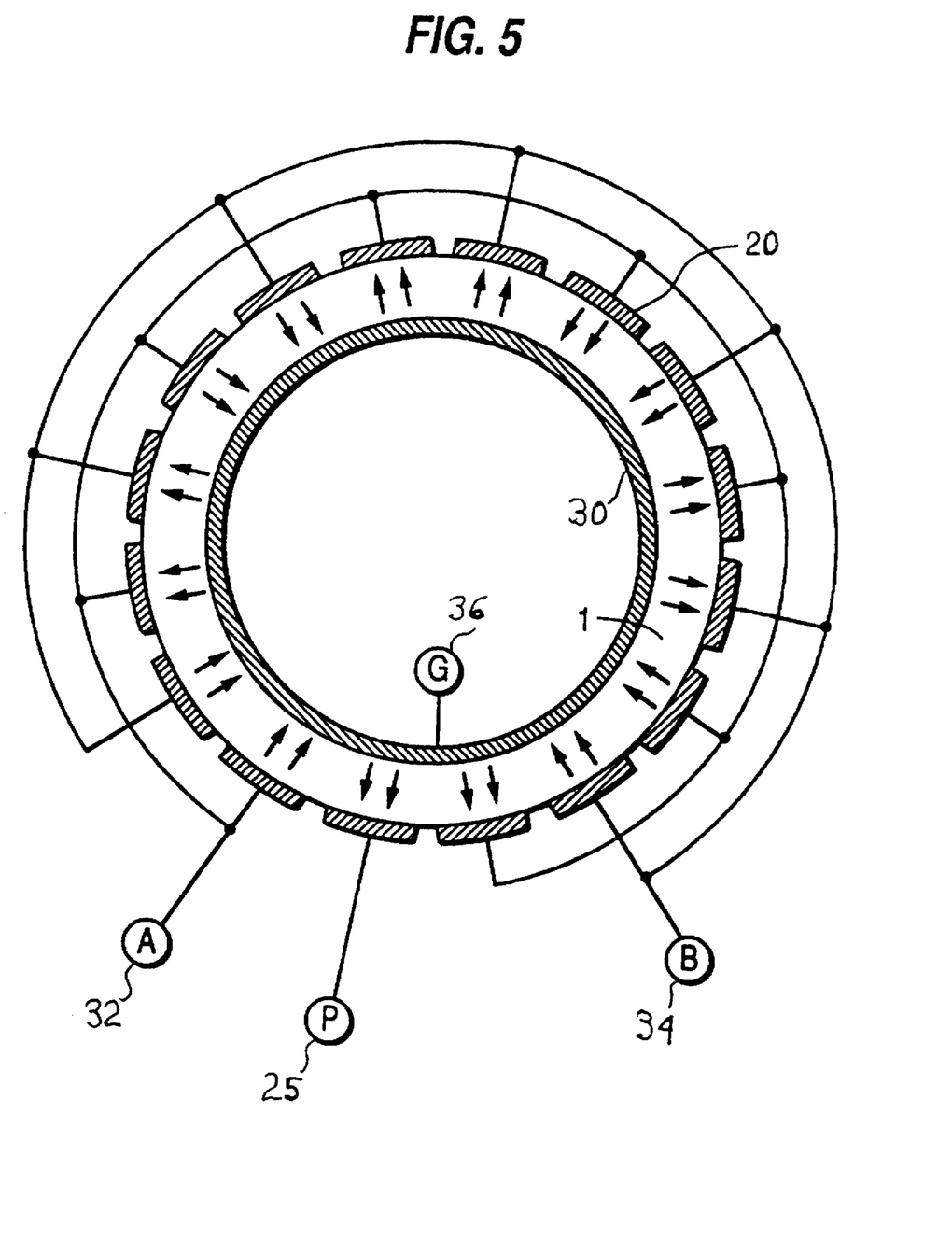
FIG. 5 is a diagram for a circular type stator.

FIG. 5 is a cross-sectional view of first part 1a of FIG. 4. Terminal P 25 represents a signal that indicates the state of the oscillation of stator 1 or moving element 4. A detailed explanation of the principle as to how progressive oscillation waves are generated in this configuration is described in Japanese Laid-Open Patent Publication Number 60-245482 and will therefore be omitted here.

Figure 6:
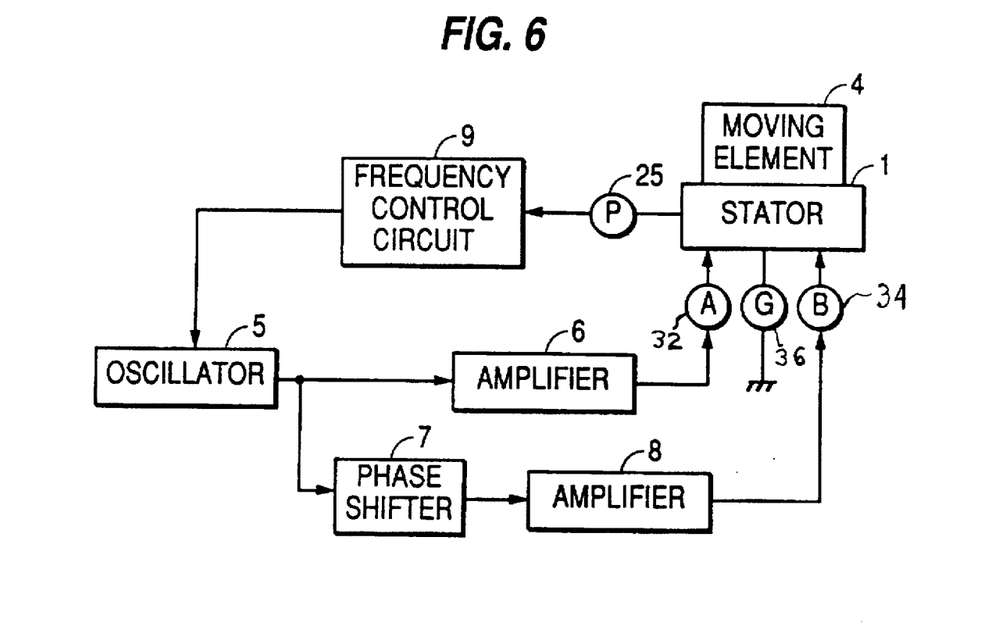
FIG. 6 is a block diagram for a circuit in the first embodiment of the present invention.

FIG. 6 is a block diagram of the functional circuits for the embodiment of the present invention. Frequency voltage generated from oscillator 5 (generally, in an ultrasound bandwidth approximately between 20 KHz to 200 KHz) is amplified by amplifier 6 and entered into stator 1 as phase A voltage from terminal A 32. In addition, frequency voltage generated from oscillator 5 is entered into phase shifter 7 where it is shifted for $\pi/2$, amplified by amplifier 8, and entered into stator 1 as phase B voltage from terminal B 34. Terminal P 25 represents a signal that indicates the state of the oscillation of stator 1 or moving element 4. Frequency determination circuit 9 controls the frequency of oscillator 5 according to signals from terminal P 25.

Figure 7A:
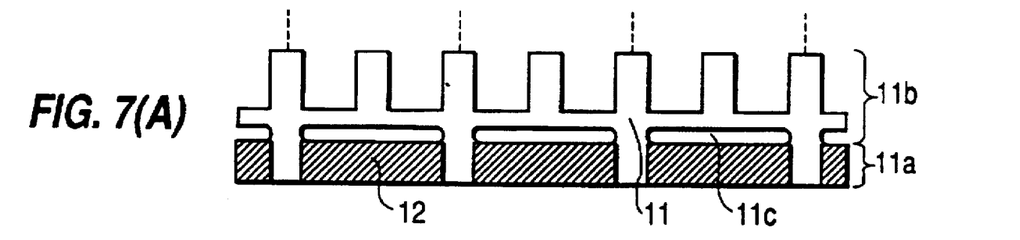
FIG. 7(A) is a front view of a stator in a second embodiment of the present invention.
Figure 7B:
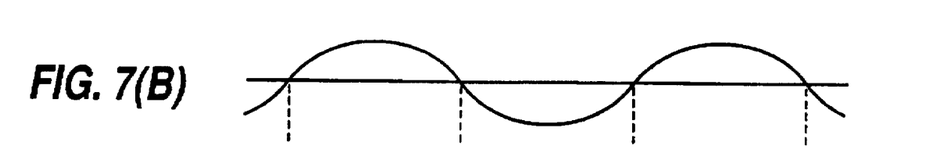
FIG. 7(B) is a diagram of a progressive oscillation wave.

FIG. 7(A) is a front view of stator 11 in a second embodiment of the present invention. Stator 11 has a first part 11a with electrodes 12 and a second part 11b with openings 11c. Correlation with moving element 4 is not described in FIG. 7(A) as the correlation is similar to the first embodiment. FIG. 7(B) is a diagram that explains the correlation between the arrangement of electrodes and the wavelength of progressive oscillation waves. FIG. 7(B) illustrates that the arrangement of two electrodes 12 corresponds to one wavelength.

A difference between this second embodiment and the first embodiment is that two openings 11c (where the PZT does not exist in second part 11b) and two electrodes 12 exist within one wavelength. Correlation between the arrangement of electrodes and the wavelength of progressive oscillation waves is similar to the correlation that is described in Japanese Laid-Open Patent Publication Number 60-245482, FIGS. 10 through 13 thereof. There is an advantage of being able to consolidate the wiring for phase A and phase B separately.

Figure 8A:
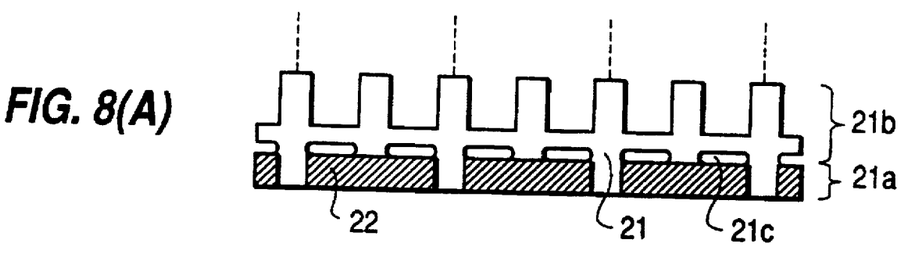
FIG. 8(A) is a front view of a stator in a third embodiment of the present invention.
Figure 8B:
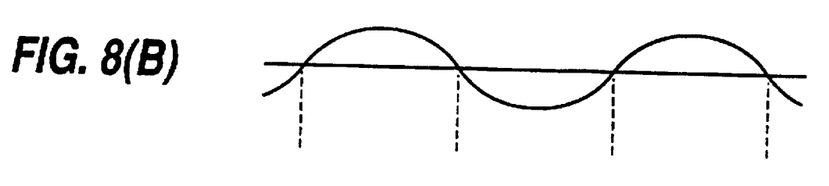
FIG. 8(B) is a diagram of a progressive oscillation wave.

FIG. 8(A) is a front view of a stator 21 in a third embodiment of the present invention. Stator 21 has a first part 21a with electrodes 22 and a second part 21b with openings 21c. Correlation with a moving element is not described in FIG. 8(A) as it is similar to the first embodiment. FIG. 8(B) is a diagram that explains the correlation between the arrangement of electrodes and the wavelength of progressive oscillation waves. FIG. 8(B) illustrates that the arrangement of two electrodes 22 correspond to one wavelength.

A difference between the third embodiment and the first embodiment is that, in the third embodiment, two electrodes 22 are placed within one wavelength. Correlation between the arrangement of electrodes and the wavelength of progressive oscillation waves is similar to the type that was described in Japanese Laid-Open Patent Publication Number 60-245482, FIGS. 10 through 13 thereof. There is an advantage of being able to consolidate the wiring for phase A and phase B separately.

As can be seen in FIGS. 7(A) and 8(A), second parts 11b and 21b have an integer number of openings 11c and 21c, respectively. In FIG. 7(A), there is one such opening 11c for each second part 11b. In FIG. 8(A), there is two such openings 21c for each second part 21b. The number of openings 11c or 21c could also be correlated to the number of electrodes 12 or 22. For example, in FIG. 7(A), there is one such opening 11c for each electrode 12. In FIG. 8(A), there are two such openings 21c for each electrode 22. Each of the openings 11c or 21c is adjacent to each other but separated by an area where the material comprising the stator exists. Each of the second parts 11b or 21b could have any integer number of openings 11c or 21c, respectively. As illustrated in FIGS. 7(A) and 8(A), openings 11c or 21c are in the same plane and have other such openings adjacent on both sides. For adjacent second parts, openings are equal distance from other adjacent openings, whether openings exist in a corresponding second part or in adjacent second parts.

The materials used for comprising stator 1 are not limited to PZT (plumb zirconate titanate) as long as the material can convert the electrical energy to mechanical energy by applying a specified process. For example, other materials such as piezoelectric materials, electrostriction materials and magnetostriction materials can be used. Furthermore, opening 1c is described as an area where an identical material with that comprising stator 1 does not exist in second part 1b. However, opening 1c is not limited to an "opening". For example, this area may be composed of metals that are less rigid, resins, inorganic materials, and so forth.

In the present invention, in order to achieve the above-noted objective and as illustrated by the first embodiment, an ultrasound motor is configured having stator 1, comprised by a first part 1a made of a material that can convert electrical energy to mechanical energy by applying a specified process and that has electrodes 20 and 30 on both sides where a specified process has been applied thereto, a second part 1b that is excluded from first part 1a wherein second part 1b includes an area where the material does not exist, and a moving element 4 that is in contact with second part 1b and that is driven by progressive oscillation waves generated in second part 1b due to the frequency of voltage applied to electrodes 20.

The stator of the present invention is configured without the use of an adhered layer. As a result, it becomes possible to use the motor in a high temperature environment.

According to the present invention as illustrated by the first embodiment, a drive part (first part 1a) and an operating part (second part 1b) of stator 1 are uniformly configured using identical materials. Therefore, it becomes possible to prevent performance fluctuations due to temperature changes and deterioration of the weather-proofing capability as compared to a stator in which a first part and a second part are not uniformly configured. In addition, manufacturing costs are reduced.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motor, comprising:
   a stator comprising
      a first part made of an energy converting material, said first part having two corresponding electrodes for applying a signal to said first part, and
      a second part made of the energy converting material, uniformly configured to said first part, and not positioned between said corresponding electrodes of said first part, said second part including projections made of the energy converting material and an opening where the energy converting material does not exist; and
   a moving element in contact with said projections of said second part and driven by progressive oscillation waves generated in said second part due to the signal applied to said electrodes, wherein
      said opening of said second part of said stator is adjacent to said first part of said stator, and
      energy converting material of said second part is between said opening and said moving element so that said opening is not adjacent to said moving element.

2. A motor as in claim 1, wherein said energy converting material is a piezoelectric material to which a polarization process is applied.

3. A motor as in claim 1, wherein said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

4. A motor as in claim 1, wherein said opening of said second part extends in parallel with the area of said first part existing between said electrodes.

5. A motor as in claim 3, wherein said opening of said second part extends in parallel with the area of said first part existing between said corresponding electrodes.

6. A motor as in claim 1, wherein
   said stator comprises a plurality of said first parts and a plurality of said second parts, said plurality of first parts being adjacent to each other and said plurality of second parts being adjacent to each other;
   one of said electrodes corresponding to each said first part is individually related to said corresponding first part and the other of said electrodes is a shared electrode of said plurality of first parts; and
   four of said individually related electrodes correspond to one wavelength of the progressive oscillation waves.

7. A motor as in claim 1, wherein
   said stator comprises a plurality of said first parts and a plurality of said second parts, said plurality of first parts being adjacent to each other and said plurality of second parts being adjacent to each other;
   one of said electrodes corresponding to each said first part is individually related to said corresponding first part and the other of said electrodes is a shared electrode of said plurality of first parts; and
   two of said individually related electrodes correspond to one wavelength of the progressive oscillation waves.

8. A motor as in claim 1, wherein
   said stator comprises a plurality of said first parts and a plurality of said second parts, said plurality of first parts being adjacent to each other and said plurality of second parts being adjacent to each other;
   one of said electrodes corresponding to each said first part is individually related to said corresponding first part and the other of said electrodes is a shared electrode of said plurality of first parts; and
   an integer number of said individually related electrodes correspond to one wavelength of the progressive oscillation waves.

9. A motor as in claim 3, wherein two of said plurality of electrodes placed on the outer circumference of said stator correspond to one wavelength of the progressive oscillation waves.

10. A motor as in claim 3, wherein four of said plurality of electrodes placed on the outer circumference of said stator correspond to one wavelength of the progressive oscillation waves.

11. A motor as in claim 3, wherein an integer number of said plurality of electrodes placed on the outer circumference of said stator correspond to one wavelength of the progressive oscillation waves.

12. A motor as in claim 1, wherein said opening of said second part includes a material that cannot convert electrical energy to mechanical energy.

13. A motor as in claim 1, wherein said second part has an integer number of said openings, each of said openings being adjacent to other respective said openings but separated by an area where said energy converting material exists.

14. A motor as in claim 3, wherein each of said plurality of second parts has an integer number of said openings, each of said openings being in the same plane and having other said openings adjacent on both sides but separated by an area where said energy converting material exists.

15. A motor as in claim 14, wherein, for adjacent of said plurality of second parts, said openings are equal distance from adjacent said openings, whether adjacent said openings exist in a corresponding one of said plurality of second parts or in an adjacent one of said plurality of second parts.

16. A motor as in claim 1, further comprising:
   a plurality of said first parts and a plurality of said second parts, said plurality of first parts being adjacent to each other and said plurality of second parts being adjacent to each other;

wherein each of said plurality of second parts has an integer number of said openings, each of said openings being in the same plane and having other said openings adjacent on both sides but separated by an area where said energy converting material exists;

wherein, for adjacent of said plurality of second parts, said openings are equal distance from adjacent said openings, whether adjacent said openings exist in a corresponding one of said plurality of second parts or in an adjacent one of said plurality of second parts.

17. A motor as in claim 15, wherein said openings of said plurality of second parts are positioned to extend in parallel with the area of said corresponding first part existing between said corresponding electrodes.

18. A motor as in claim 16, wherein said openings of said plurality of second parts are positioned to extend in parallel with the area of said corresponding first part existing between said corresponding electrodes.

19. A motor, comprising:
a stator comprising:
a first part made of an energy converting material, said first part having two corresponding electrodes for applying a signal to said first part, and
a second part uniformly configured to said first part and having at least a partial area adjacent to said first part where said energy converting material does not exist, said second part not being positioned between said corresponding electrodes of said first part; and
a moving element in contact with said second part and driven by progressive oscillation waves generated in said second part due to the signal applied to said electrodes, wherein said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

20. A motor as in claim 19, wherein two of said plurality of electrodes placed on the outer circumference of said stator correspond to one wavelength of the progressive oscillation waves.

21. A motor as in claim 19, wherein four of said plurality of electrodes placed on the outer circumference of said stator correspond to one wavelength of the progressive oscillation waves.

22. A motor as in claim 19, wherein an integer number of said plurality of electrodes placed on the outer circumference of said stator correspond to one wavelength of the progressive oscillation waves.

23. A motor as in claim 19, wherein said partial area of said second part where said energy converting material does not exist extends in parallel to the area of said first part existing between said corresponding electrodes.

24. A motor as in claim 19, wherein each of said plurality of second parts has an integer number of said partial areas where said energy converting material does not exist, each of said partial areas being in the same plane and having other said partial areas adjacent on both sides but separated by an area where said energy converting material exists.

25. A motor as in claim 24, wherein, for adjacent of said plurality of second parts, said partial areas are equal distance from adjacent said partial areas, whether adjacent said partial areas exist in a corresponding one of said plurality of second parts or in an adjacent one of said plurality of second parts.

26. A motor as in claim 25, wherein said partial areas of said plurality of second parts are positioned to extend in parallel with the area of said corresponding first part existing between said corresponding electrodes.

27. A motor, comprising:
a stator comprising:
a first part made of an energy converting material, said first part having two corresponding electrodes for applying a signal to said first part, and
a second part uniformly configured to said first part and having at least a partial area adjacent to said first part where said energy converting material does not exist, said second part not being positioned between said corresponding electrodes of said first part; and
a moving element in contact with said second part and driven by progressive oscillation waves generated in said second part due to the signal applied to said electrodes, wherein
said second part is made of the energy converting material, the energy converting material not existing in said partial area of said second part, and
said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

28. A motor as in claim 27, wherein two of said plurality of electrodes placed on the outer circumference of said stator correspond to one wavelength of the progressive oscillation waves.

29. A motor as in claim 27, wherein an integer number of said plurality of electrodes placed on the outer circumference of said stator correspond to one wavelength of the progressive oscillation waves.

30. A motor, comprising:
a stator comprising:
a first part made of an energy converting material, said first part having two corresponding electrodes for applying a signal to said first part, and
a second part made of the energy converting material and uniformly configured to said first part, the second part having at least a partial area adjacent to said first part where said energy converting material does not exist, said second part not being positioned between said corresponding electrodes of said first part; and
a moving element in contact with said second part and driven by progressive oscillation waves generated in said second part due to the signal applied to said electrodes, wherein said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

31. A motor as in claim 30, wherein said partial area of said second part where said energy converting material does not exist extends in parallel with the area of said first part existing between said corresponding electrodes.

32. A motor as in claim 30, wherein two of said plurality of electrodes placed on the outer circumference of said stator correspond to one wavelength of the progressive oscillation waves.

33. A motor as in claim 30, wherein four of said plurality of electrodes placed on the outer circumference of said stator correspond to one wavelength of the progressive oscillation waves.

34. A motor as in claim 30, wherein an integer number of said plurality of electrodes placed on the outer circumference of said stator correspond to one wavelength of the progressive oscillation waves.

35. A motor as in claim 30, wherein each of said plurality of second parts has an integer number of said partial areas where said energy converting material does not exist, each of said partial areas being in the same plane and having other said partial areas adjacent on both sides but separated by an area where said energy converting material exists.

36. A motor as in claim 35, wherein, for adjacent of said plurality of second parts, said partial areas are equal distance from adjacent said partial areas, whether adjacent said partial areas exist in a corresponding one of said plurality of second parts or in an adjacent one of said plurality of second parts.

37. A motor as in claim 36, wherein said partial areas of said plurality of second parts are positioned to extend in parallel with the area of said corresponding first part existing between said corresponding electrodes.

38. A motor, comprising:
a stator comprising:
a first part made of an energy converting material, said first part having two corresponding electrodes for applying a signal to said first part, and
a second part made of the energy converting material and uniformly configured to said first part, the second part having at least a partial area adjacent to said first part where said energy converting material does not exist, said second part not being positioned between said corresponding electrodes of said first part; and
a moving element in contact with said second part and driven by progressive oscillation waves generated in said second part due to the signal applied to said electrodes wherein
said second part is made of the energy converting material, the energy converting material not existing in said partial area of said second part, and
said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

39. A motor as in claim 38, wherein two of said plurality of electrodes placed on the outer circumference of said stator correspond to one wavelength of the progressive oscillation waves.

40. A motor as in claim 38, wherein an integer number of said plurality of electrodes placed on the outer circumference of said stator correspond to one wavelength of the progressive oscillation waves.

41. A motor, comprising:
a stator comprising:
a first part made of an energy converting material, said first part having two corresponding electrodes for applying a signal to said first part, and
a second part made of the energy converting material and uniformly configured to said first part, the second part having at least a partial area where said energy converting material does not exist, said second part not being positioned between said corresponding electrodes of said first part; and
a moving element in contact with said second part and driven by progressive oscillation waves generated in said second part due to the signal applied to said electrodes, said partial area of said second part of said stator being adjacent to said first part of said stator and not being adjacent to said moving element,
wherein said stator has a circular configuration with a plurality of first parts and a plurality of second parts, said plurality of first parts being adjacent to each other and said plurality of second parts being adjacent to each other, with said electrodes placed on the inner and outer circumferences, respectively, of said stator, said electrode on the inner circumference of said stator being a shared electrode of said plurality of first parts and said electrode placed on the outer circumference of said stator comprising a plurality of electrodes individually related to a respective, corresponding first part.

42. A motor as in claim 41, wherein said partial area of said second part where said energy converting material does not exist extends in parallel with the area of said first part existing between said corresponding electrodes.

43. A motor as in claim 41, wherein two of said plurality of electrodes placed on the outer circumference of said stator correspond to one wavelength of the progressive oscillation waves.

44. A motor as in claim 41, wherein four of said plurality of electrodes placed on the outer circumference of said stator correspond to one wavelength of the progressive oscillation waves.

45. A motor as in claim 41, wherein an integer number of said plurality of electrodes placed on the outer circumference of said stator correspond to one wavelength of the progressive oscillation waves.

46. A motor as in claim 41, wherein each of said plurality of second parts has an integer number of said partial areas where said energy converting material does not exist, each of said partial areas being in the same plane and having other said partial areas adjacent on both sides but separated by an area where said energy converting material exists.

47. A motor as in claim 46, wherein, for adjacent of said plurality of second parts, said partial areas are equal distance from adjacent said partial areas, whether adjacent said partial areas exist in a corresponding one of said plurality of second parts or in an adjacent one of said plurality of second parts.

48. A motor as in claim 47, wherein said partial areas of said plurality of second parts are positioned to extend in parallel with the area of said corresponding first part existing between said corresponding electrodes.

* * * * *